United States Patent [19]
Wollenweber et al.

[11] Patent Number: 5,725,815
[45] Date of Patent: Mar. 10, 1998

[54] FOAM CONTROL AGENTS FOR THE FOOD, PAINT AND PAPER INDUSTRIES

[75] Inventors: Horst-Werner Wollenweber; Thomas Moeller, both of Duesseldorf; Hans-Juergen Sladek, Krefeld; Heinz-Guenther Schulte, Muelheim; Wolfgang Gress, Wuppertal; Ulrich Eicken, Korschenbroich; Herbert Fischer, Duessldorf, all of Germany; Christian De Haut, Boissise-le-Roi, France

[73] Assignee: Henkel Kommanditgesellschaft auf Aktien, Plymouth Meeting, Pa.

[21] Appl. No.: 525,520

[22] PCT Filed: Mar. 7, 1994

[86] PCT No.: PCT/EP94/00683

§ 371 Date: Nov. 9, 1995

§ 102(e) Date: Nov. 9, 1995

[87] PCT Pub. No.: WO94/21348

PCT Pub. Date: Sep. 29, 1994

[30] Foreign Application Priority Data

Mar. 15, 1993 [DE] Germany .................. 43 08 140.1

[51] Int. Cl.$^6$ .................................. B29C 65/00

[52] U.S. Cl. ................ 264/41; 264/42; 264/50; 264/51; 264/52; 521/99; 521/114; 521/117; 521/149; 521/155

[58] Field of Search .................. 521/99, 114, 117, 521/149, 155; 252/321, 358; 264/41, 42, 50, 51, 52

[56] References Cited

U.S. PATENT DOCUMENTS 4,092,266  5/1978  Abel et al. .

FOREIGN PATENT DOCUMENTS

| | | |
|---|---|---|
| 48038358 | 12/1970 | Japan . |
| 1336428 | 11/1973 | United Kingdom . |
| 9211074 | 7/1992 | WIPO . |

*Primary Examiner*—John M. Cooney, Jr.
*Attorney, Agent, or Firm*—Ernest G. Szoke; Wayne C. Jaeschke; Real J. Grandmaison

[57] ABSTRACT

The process of controlling foam in a foam-generating system by adding to the system a foam-inhibiting effective amount of a block copolymer containing alkylene oxide units obtained by reacting a homopolymer or copolymer of alkylene oxides with a diisocyanate or a dicarboxylic acid derivative containing 2 to 44 carbon atoms.

15 Claims, No Drawings

FOAM CONTROL AGENTS FOR THE FOOD, PAINT AND PAPER INDUSTRIES

BACKGROUND OF THE INVENTION

1. Field of the Invention

This invention relates to the use of block copolymers containing alkylene oxide units as foam control agents in the production or further processing of foods, paints, lacquers, paper and in fermentation processes.

In the industrial production and/or processing of foods, considerable importance is attributed to the control and prevention of foam. For example, in the industrial processing of sugar-containing plant juices, as practised on a large scale in the processing of sugar beet, particular difficulties are caused by excessive foaming in recovery and purification of the juice and in the evaporators. The foam control agents used in the sugar industry must of course be physiologically safe. The same applies to foam control agents used in the manufacture of potato products, such as chips or French fries, or even in the production of baker's yeast using molasses. In addition, the foam control agents used in the potato-processing industry must be capable of regulating starch foam which is difficult to control. In addition, the user always expects foam control agents to develop good spontaneous and long-term activity in small amounts.

2. Discussion of Related Art

Fats and oils, such as rapeseed oil, peanut oil, olive oils and wool grease, have long been used for foam inhibition in the sugar and yeast industries. Synthetic esters, such as fatty acid monoglycerides, fatty acid polyglycol esters, and synthetic alcohols, such as polyalkylene glycols and alkylene oxide adducts with fatty alcohols, have also been proposed for this purpose. Although a certain foam-suppressing effect can be achieved with these compounds, they often have to be used in excessive quantities or only develop their effect at certain temperatures and not over broad temperature ranges.

In the case of lacquers and paints, air can be stirred in during homogenization of the paint or lacquer ingredients. This is a particular disadvantage because either the user has to wait a very long time for the air bubbles to burst before he can begin applying the paint or lacquer or, alternatively, the lacquer or paint coating contains bubbles. Paint or lacquer coatings with surface defects are not only optically unattractive, they are also far from durable because dried bubbles readily lead to flaking of the films. In order to avoid troublesome air bubbles both during homogenization and during application, silicone-based foam control agents are best added. Although these foam control agents are capable of effectively destroying the air bubbles, they are attended by the major disadvantage that the paint or lacquer coating on various substrates, for example glass, is uneven. This is presumably because the highly hydrophobic silicones prevent thorough and uniform wetting of the substrate to be coated.

Troublesome foam can also be formed in the papermaking industry through a high air content in the water circuit of papermaking machines. Thus, foam marks can appear on the paper when foam passes with floated soil onto the paper web during sheet formation. Since increasingly higher machine speeds are also being used in papermaking, there is an increased risk of air entering the fiber suspension. The air thus incorporated interferes with dewatering of the paper stock on the paper machine in the form of air bubbles and leaves the paper sheet with a porous structure. These disadvantages are intensified by the latest papermaking machines because the water circuits are now increasingly closed. Foam-forming and foam-stabilizing substances collect in the closed systems. In addition, the temperature of the circulated water of the papermaking machine can change during production. Accordingly, foam inhibitors which develop a long-term effect over wide temperature ranges in small quantities are also required in the papermaking industry.

International patent application WO 92/11074 describes foam inhibitors based on carboxylic acid derivatives, for example esters and amides of citric acid, tartaric acid, succinic acid, maleic acid and ethylenediamine tetraacetic acid. These foam inhibitors may be used directly or emulsified in water in paper manufacture and in the coating of paper. If the foam inhibitors are used in the form of aqueous emulsions, the foam inhibitor formulation additionally contains emulsifiers, such as the known ethoxylated fatty alcohols, ethoxylated fatty acids and propylene oxide/ethylene oxide block polymers. However, the disadvantage of these emulsifier-containing foam inhibitor mixtures is that the emulsifiers themselves can contribute to a certain extent towards stabilization of the air bubbles. Apart from this, it is necessary first of all to prepare a formulation which enables these compounds to be used in the form of an aqueous emulsion. Finally, mixtures of compounds differing in their emulsifiability in water tend fairly often to separate and cream up.

The problem addressed by the present invention was to provide foam control agents which would develop a good spontaneous effect in small quantities and which would remain effective for long periods. In addition, the foam control agents would be able to be tailor-made so that they would be effective over wide temperature ranges. In the paint and lacquer industry, the foam control agents would not only have a good foam-inhibiting effect, they would also provide for uniform lacquer and paint coatings. This would also apply in particular to the coating of paper where a uniform coating without significant surface defects is important. If necessary, the block copolymers would also be at least partly convertible into aqueous emulsions without any need for external emulsifiers to be added.

DESCRIPTION OF THE INVENTION

According to the invention, the problem stated above has been solved by the use of block copolymers containing alkylene oxide units obtainable by reaction of homopolymers and/or copolymers of alkylene oxides with diisocyanates or dicarboxylic acid derivatives containing 2 to 44 carbon atoms as foam control agents in the production or further processing of foods, lacquers, paints, paper and in fermentation processes.

In the context of the invention, foam control agents are understood to be agents which are capable as foam inhibitors of suppressing foam which has formed and/or of preventing foam in the process of formation or, as deaerators, of driving air bubbles to the surface.

The block copolymers containing alkylene oxide units used in accordance with the invention are compounds known per se which may be prepared in known manner by reaction of homopolymers and/or copolymers of alkylene oxides with diisocyanates and/or dicarboxylic acid derivatives. The reaction with dicarboxylic acid derivatives is preferably carried out in the presence of an esterification catalyst, for example based on a tin compound, and generally at temperatures of 60° to 200° C. The reaction with diisocyanates can also be carried out in the presence of catalysts which accelerate urethanization, such as dibutyl tin dilaurate. The urethanization temperatures are generally in the range from 20° C. to 120° C. If desired, the reaction may be carried out in the presence of an inert solvent, for example xylene, any solvent used being subsequently removed from the reaction mixture, preferably on completion of the reaction.

In a particularly preferred embodiment, the block copolymers are prepared by reaction of homopolymers and/or copolymers of alkylene oxides with diisocyanates or dicarboxylic acid derivatives in a molar ratio of 2:1 to 1:2. If the ratio between the reactants differs from the strictly stoichiometric equivalent ratio of 1:1, the block copolymers formed are terminated by free carboxylic acid derivative groups, isocyanate groups or hydroxyl groups. According to the invention, block copolymers such as these terminated by free functional groups may be directly used. However, they may also be subsequently reacted with monofunctional compounds capable of reacting with the terminal groups. Reactions such as these are often known as end capping. The end capping may be partial or complete.

Examples of monofunctional compounds are alcohols and amines for terminal isocyanate groups, alcohols for carboxylic acid derivative groups and monocarboxylic acids for hydroxyl groups. End cappings such as these are known as urethane, esterification, transesterification and urea reactions.

According to the invention, ethylene oxide, propylene oxide and butylene oxide are preferred alkylene oxides. Accordingly, examples of homopolymers and copolymers of alkylene oxides are polyethylene glycols, polypropylene glycols, polybutylene glycols or even copolymers of ethylene oxide, propylene oxide and/or butylene oxide.

One embodiment of the present invention is characterized by the use of block copolymers obtainable by reaction of diisocyanates. Suitable diisocyanates are optionally alkyl-substituted alkylene diisocyanates, for example hexamethylene diisocyanate or trimethyl hexamethylene diisocyanate, the compounds derived from isophorone diisocyanate, ortho-, meta- and para-phenylene diisocyanate, the methylene diphenyl diisocyanates, the methylene dicyclohexyl diisocyanates, the tolylene diisocyanates, the xylylene diisocyanates and the tetramethyl xylylene diisocyanates and mixtures thereof. Block copolymers obtained by reactions of, for example, the diisocyanates listed above with homopolymers and/or copolymers of ethylene oxide and/or propylene oxide in molar ratios of hydroxyl groups to isocyanate groups of 1:2 to 2:1 and preferably 1.1:1 to 1.6:1 are suitable. Within this group, block copolymers obtained by reaction with a mixture of the homopolymers of ethylene oxide (also known commonly as polyethylene glycol) and propylene oxide (also known commonly as polypropylene glycol) are particularly preferred. Block copolymers such as these contain the blocks $(C_3H_6O)_a$ and $(C_2H_4O)_b$, in which the numbers a and b derive from the molecular weights of the polypropylene glycol and polyethylene glycol. However, it is not only the molecular weight of the polypropylene glycol or polyethylene glycol which is of particular importance, but also the total quantity of polyethylene glycol and polypropylene glycol present in the block copolymer. For this reason, it is best to indicate the percentages by weight of polypropylene glycol and polyethylene glycol in the mixture. Block copolymers which have been prepared by reaction of diisocyanates with a mixture of 1 to 99% by weight and preferably 50 to 95% by weight of polypropylene glycol and 1 to 99% by weight of polyethylene glycol and preferably 5 to 50% by weight of polyethylene glycol are particularly suitable. The higher the percentage of polyethylene glycol, the greater the effectiveness of the block copolymers at relatively high temperatures. Accordingly, it is possible through the quantities of polypropylene glycol and polyethylene glycol used to prepare foam inhibitors which develop their maximum effectiveness as foam control agents in certain desired temperature ranges. If foam control agents developing maximum effectiveness at relatively low temperatures are to be produced from block copolymers belonging to the described group, it is preferred to use those block copolymers which have been prepared by reaction with a mixture of 75 to 95% by weight of polypropylene glycol and 5 to 25% by weight of polyethylene glycol. Thus, block copolymers which have been obtained by reaction of diisocyanates selected from the group consisting of tolylene diisocyanate, tetramethyl xylylene diisocyanate, hexamethylene diisocyanate and trimethyl hexamethylene diisocyanate with a mixture of 75 to 95% by weight of polypropylene glycol and 25 to 5% by weight of polyethylene glycol have proved to be particularly suitable for external use in the transport and washing of sugar beet.

A second embodiment of the present invention is characterized by the use of block copolymers obtainable by reaction of dicarboxylic acid derivatives with homopolymers and/or copolymers of alkylene oxides. Useful dicarboxylic acid derivatives are formyl derivatives of linear $\alpha,\omega$-dicarboxylic acids or dicarboxyl-substituted aromatic compounds. Carboxylic acid derivatives are understood to be both dicarboxylic acids, dicarboxylic anhydrides, dicarboxylic acid chlorides and lower alkyl esters of dicarboxylic acids, more particularly methyl or ethyl esters. Suitable dicarboxylic acid derivatives are derivatives of oxalic acid, malonic acid, succinic acid, maleic acid, fumaric acid, adipic acid, pimelic acid, suberic acid, azelaic acid, brassylic acid, phthalic acid, isophthalic acid, terephthalic acid, glutaric acid, dimer fatty acid and mixtures thereof. One example of a mixture is the mixture of dicarboxylic acids containing adipic acid, glutaric acid and succinic acid which is known under the trade name of Sokalan® DCS. Within the group of dicarboxylic acid derivatives, succinic acid, fumaric acid and/or maleic acid derivatives are particularly preferred.

Within the group of block copolymers bearing an ester group through the reaction with the dicarboxylic acid derivatives, those obtainable by reaction of dicarboxylic acid derivatives, preferably dicarboxylic anhydrides, with homopolymers and/or copolymers of ethylene oxide or propylene oxide in a molar ratio of hydroxyl groups to carboxyl groups of 1:2 to 2:1 and preferably 1.2:1 to 1.6:1 are particularly preferred. Within this group of block copolymers bearing an ester group through the reaction with dicarboxylic acid derivatives, it is particularly preferred to use homopolymers of ethylene oxide (polyethylene glycol) and/or propylene oxide (polypropylene glycol). Although block copolymers containing only polypropylene glycol or polyethylene glycol are effective as foam control agents, it is particularly preferred to use the group of block copolymers which have been obtained by reaction of dicarboxylic acid derivatives with a mixture of 1 to 99% by weight and preferably more than 50% by weight of polypropylene glycol and 1 to 99% by weight and preferably less than 50% by weight of polyethylene glycol. Where the block copolymers are used as foam control agents for low temperatures, i.e. below 35° C., it is advisable to use those block copolymers which have been obtained by reaction of dicarboxylic acid derivatives with a mixture of 85 to 99% by weight of polypropylene glycol and 1 to 15% by weight of polyethylene glycol. Block copolymers which have been produced solely from polyethylene glycol or of which the mixture contains more than 55% by weight of polyethylene glycols besides polypropylene glycols may be used for relatively high temperature applications, for example in fermentation processes.

The polyethylene glycols which are regarded as homopolymers of ethylene oxide may have a molecular weight of 200 to 35,000 and preferably 200 to 6,000. The polypropylene glycols regarded as homopolymers of propylene oxide may have a molecular weight of 300 to 20,000 and preferably in the range from 1,000 to 6,000. Even when copolymers of ethylene oxide and propylene oxide are used, even together with butylene oxide, the molecular weights are preferably up to 10,000 and, more preferably, up to 3,000.

The block copolymers to be used in accordance with the invention are liquid to highly viscous products which, in individual cases, may even be described as solid. Where the block copolymers are added to foam-forming systems, foaming is considerably reduced even in the presence of very small quantities. The block copolymers are capable both of reducing foam which has already formed and of preventively avoiding foaming and of acting as deaerators. The block copolymers may be added to the systems either in pure form or in the form of a solution or dispersion. If the block copolymers are to be used in the form of solutions or dispersions, alcohols, esters, methylene chloride, etc. may be used as the liquid organic medium. However, water may also be used as the solvent. If the block copolymers have high contents of polyethylene glycols and relatively low contents of polypropylene glycols, they are self-emulsifiable in water, i.e. they may be emulsified or dispersed in water without the addition of external emulsifiers. If, however, the hydrophobic polypropylene glycol component predominates in the block copolymers, it is necessary either to use other solvents or to add external emulsifiers. Whether or not the block copolymers are self-emulsifiable can be determined by simple small-scale tests in which water is added to the substances and an attempt is made to emulsify or disperse them by stirring.

The block copolymers may be used in the paper industry for pulp production, for example in the boiling of sulfite pulp, in papermaking and in the coating of paper. In addition, the block copolymers may be used in the food industry, in the production and processing of food, for example in the sugar industry in the flotation and in the washing and chipping of sugar beet, in the extraction of sugar from the beet chips and in the subsequent treatment with milk of lime and also in the multistage evaporators in which water is removed until a crystal sludge oversaturated with sugar, the so-called fillmass, is formed. The block copolymers may also be used in the yeast industry in the industrial production of baker's yeast by fermentation. The aerobic fermentation stage above all is accompanied by intensive foaming which can be prevented or reduced by the block copolymers. In addition, the block copolymers may be used in the processing of potatoes because they eliminate the starch foam which is difficult to control. The block copolymers may also be used without difficulty in the paint and lacquer industry where they destroy all the foam formed—in particular by introduction of air—without in any way impairing the quality of the paints or lacquers. The quantity of block copolymers used varies according to the particular application. In principle, every effort will be made to use them in small quantities for economic reasons alone. In general, the quantity of block copolymers used is between 10 and 10,000 ppm, depending on the particular application.

The present invention also relates to a process for controlling foam in the production and further processing of foods, paints, lacquers and paper and in fermentation processes, characterized in that block copolymers containing alkylene oxide units obtainable by reaction of homopolymers and/or copolymers of alkylene oxides with diisocyanates or dicarboxylic acid derivatives are added.

As mentioned in the foregoing, the block copolymers may be added before or even after foaming, depending on what is required and on the extent to which the foam already formed is problematical. Further particulars of the processes can be found in the foregoing.

EXAMPLES

A) Production of the Block Copolymers

AA) Esters of Succinic Anhydride or Sokalan DCS®

Polypropylene glycol (PPG) with average molecular weights of 1,000, 2,000, 3,000 or 4,000 was esterified together with polyethylene glycol (PEG) with average molecular weights of 400, 600 or 1,000 and succinic anhydride or Sokalan® in the presence of 0.1% by weight, based on reactants, of an acidic esterification catalyst (Swedcat®3, a product of Swedstab) in boiling xylene in an inert gas atmosphere. The water of reaction formed was azeotropically distilled off. The reaction was continued until hardly any residual acid values were present. The xylene was then distilled off in vacuo. Viscous liquids were obtained. The equivalents of PPG and PEG used are shown in Table 1. The quantity of succinic anhydride or Sokalan DCS® used was gauged in such a way that the equivalent ratio of hydroxyl groups in PPG and PEG to carboxyl groups of the acid component shown in Table 1 was obtained.

Sokalan DCS®, a product of BASF, is a mixture of at most 33% of adipic acid, at most 50% by weight of glutaric acid and at most 31% by weight of succinic acid (characteristic data: acid value approx. 820 mg KOH/g, melting range approx. 95°–130° C.).

TABLE 1

| | A1 | A2 | A3 | A4 | A5 | A6 | A7 |
|---|---|---|---|---|---|---|---|
| PPG-1000 | 19.0 | 11.4 | — | — | — | — | — |
| PPG-2000 | — | — | 6.4 | — | — | — | — |
| PPG-3000 | — | — | — | 4.3 | — | 4.3 | — |
| PPG-4000 | — | — | — | — | 3.2 | — | 3.2 |
| PEG-600 | — | 1.0 | 1.0 | 1.0 | 1.0 | 1.0 | 1.0 |
| PEG-1000 | 1.0 | — | — | — | — | — | — |
| OH:COOH | 1.2 | 1.24 | 1.2 | 1.15 | 1.14 | 1.15 | 1.14 |
| Succinic anhydride | x | x | x | x | x | | |
| Sokalan DSC® | | | | | | x | x |
| % By weight | | | | | | | |
| PPG | 95 | 95 | 95.5 | 95 | 95 | 95 | 95 |
| PEG | 5 | 5 | 4.5 | 5 | 5 | 5 | 5 |

A8) to A10) The free OH groups of products A1 and A3 were esterified with oleic acid or stearic acid:
A8) 0.5 equivalent of A1 and 1 equivalent of stearic acid;
A9) 0.5 equivalent of A1 and 1 equivalent of oleic acid;
A10) 0.5 equivalent of A3 and 1 equivalent of stearic acid.

AB) Urethanes

PPG and PEG with the average molecular weights shown in Table 2 were reacted in known manner with the various diisocyanates listed in Table 2 in the presence of 0.1% by weight of dibutyl tin dilaurate, based on reactants, until no more free NCO groups could be detected. Table 2 shows the equivalents of PPG and PEG used and also the equivalent ratio of the hydroxyl groups emanating from PPG+PEG to the isocyanate groups (OH:NCO).

TABLE 2

|  | B1 | B2 | B3 | B4 | B5 | B6 | B7 |
|---|---|---|---|---|---|---|---|
| PPG-2000 | 6.5 | 6.5 | 6.5 | 6.5 | — | — | 6.5 |
| PPG-3000 | — | — | — | — | 3.8 | — | — |
| PPG-4000 | — | — | — | — | — | 2.9 | — |
| PEG-600 | 1.0 | 1.0 | 1.0 | 1.0 | 1.0 | 1.0 | 1.0 |
| 2,4-Tolylene diisocyanate (TDI) | — | — | — | 5.0 | 4.0 | 3.2 | — |
| Tetramethyl xylylene diisocyanate (TMXDI) | 6.4 | — | — | — | — | — | — |
| Hexamethylene diisocyanate (HMDI) | — | — | 6.4 | — | — | — | — |
| Isophorone diisocyanate (IPDI) | — | 6.4 | — | — | — | — | — |
| Trimethyl hexamethylene diisocyanate (TMDI) | — | — | — | — | — | — | 6.4 |
| OH:NCO | 1.17 | 1.17 | 1.17 | 1.5 | 1.19 | 1.19 | 1.17 |
| % By weight |  |  |  |  |  |  |  |
| PPG | 95.5 | 95.5 | 95.5 | 95.5 | 95 | 95 | 95.5 |
| PEG | 4.5 | 4.5 | 4.5 | 4.5 | 5 | 5 | 4.5 |

B) Foam-Inhibiting Effect of the Block Copolymers

BA) Foam Inhibitors for Lacquers Based on a Styrene/Butadiene Binder

The foam-inhibiting effect of the block copolymers described in A) was tested in lacquer dispersions of 80 parts by weight of Acronal 290 D®, a product of BASF (styrene/butadiene copolymer; approximately 50% by weight in water), and 20 parts by weight of deionized water by the density method. To this end, density 1 of the lacquer dispersion carefully stirred with 0.2, 0.4 or 0.6% by weight of foam inhibitor was first determined. Air was then stirred in by exposing the foam-inhibited lacquer dispersion to a Pendraulik type LM 34 laboratory mixer (Pendraulik Maschinen und Apparate GmbH), the foam being generated by a dispersion disk (Ø 4 cm). After 3 minutes at 3000 r.p.m., density 2 was determined. The quotient of density 1 and density 2 is a reflection of the foam-inhibiting and deaerating effect. The closer the value is to 1, the better the foam inhibitor. The results are set out in Tables 3a and 3b.

TABLE 3a

| Foam inhibitor in lacquer dispersions | | | | | | | | | | |
|---|---|---|---|---|---|---|---|---|---|---|
| Quantity added in % by weight | A1 | A2 | A3 | A4 | A5 | A6 | A7 | A8 | A9 | A10 |
| 0.2 | 0.93 | 0.96 | 0.95 | 0.79 | 0.88 | 0.87 | 0.91 | 0.97 | 0.95 | 0.95 |
| 0.4 | 0.93 | 0.97 | 0.97 | 0.87 | 0.94 | 0.90 | 0.92 | 0.97 | 0.95 | 0.96 |
| 0.6 | 0.93 | 0.97 | 0.97 | 0.89 | 0.90 | 0.93 | 0.93 | 0.97 | 0.95 | 0.96 |

TABLE 3b

| Foam inhibitor in lacquer dispersions | | | | | | |
|---|---|---|---|---|---|---|
| Quantity added in % by weight | B1 | B2 | B3 | B4 1[a) | Comp. [b) | Blank |
| 0.2 | 0.84 | 0.72 | 0.88 | 0.8 | 0.78 | 0.52 |
| 0.4 | 0.92 | 0.80 | 0.90 | 0.8 | 0.83 | 0.52 |
| 0.6 | 0.91 | 0.86 | 0.88 | 0.90 | 0.82 | 0.52 |

[a)Comp. 1 Dehydran 1293 ®
[b)Blank = no emulsifier added

BB) Foam Inhibitors for Lacquers Based on Polyacrylate and Polyurethane Dispersions The foam-inhibiting effect was determined by the free fall circulation method in the following formulations:

| 12.5 | parts by weight | polyacrylate dispersion (Neocryl BT 44 ® of Polyvinylchemie) or polyurethane dispersion (Alberdingk APU 1060 ®, a product of Alberdingk and Boley) |
|---|---|---|
| 237.0 | parts by weight | deionized water |
| 0.125 | part by weight | foam inhibitor according to the invention. |

The results are set out in Table 4. In the free fall circulation method, the formulation to be tested is introduced into a 1000 ml upright cylinder and continuously pump-circulated at 4 l/min. by means of a Heidolph flow inducer. A silicone hose (12×1.5 mm) and two glass tubes (11×1.5 mm) are used in this pump. The intake tube is situated at a distance of 5 to 10 mm from the bottom of the upright cylinder. The end of the inflow pipe is fixed to the 1000 ml mark. The foam and liquid volumes (in ml) occurring after various minutes were recorded. The lower the value, the better the foam-inhibiting effect.

TABLE 4

| | Foam inhibitors for lacquers | | | | |
|---|---|---|---|---|---|
| | Foam inhibitor | Total volumes after | | | |
| Binder | acc. to Ex. | 5 | 10 | 20 | 30 minutes |
| Neocryl BT 44 ® | A1 | 170 | 170 | 170 | 170 |
| | A2 | 170 | 170 | 170 | 180 |
| | None | 1000 | 1000 | 1000 | 1000 |
| Alberdingk APU 1060 ® | A1* | 220 | 220 | 240 | 270 |
| | None | 900 | 900 | 900 | 900 |

*10% by weight solution in dipropylene glycol monomethyl ether

To test the compatibility of the foam inhibitors in the lacquer dispersions, 1 part by weight of a 10% by weight solution of A1 in dipropylene glycol monomethyl ether was added to 100 parts by weight of Alberdingk APU 1060®. The resulting dispersion was knife-coated onto glass with a 100 μm wide gap. No microfoam, flow problems or craters occurred. The wet film was defect-free.

BC) Foam Inhibitors for Sugar Beet Juice 250 g of a 10% by weight aqueous solution of sugar beet and 200 microliters of a 10% by weight solution of block copolymers in isopropanol were poured into a 500 ml capacity screw-top glass container. A mixture with a polyglycerol partial ester containing ethylene and propylene oxide units was prepared for comparison. Both mixtures were manually shaken 20 times in the glass container. The time which the foam mountain took to collapse to a foam surface in which a hole (diameter approx. 5 cm) was formed was then determined. The shorter the time, the better the foam-inhibiting effect. The results (in seconds) are set out in Table 5.

TABLE 5

| Foam inhibitors for sugar beet sirup | | | | | | | | | | | | | | |
|---|---|---|---|---|---|---|---|---|---|---|---|---|---|---|
| A1 | A2 | A3 | A4 | A5 | A6 | A7 | A9 | A8 | A10 | B1 | B2 | B5 | B6 | B7 | Blank value |
| 11 | 11 | 6 | 10 | 8 | 5 | 5 | 5 | 5 | 5 | 40 | 80 | 10 | 9 | 40 | >1 Hour |

BD) Foam Inhibitors for Paper Coating Slips 50 microliters of pure foam inhibitor were added to 100 ml of a coating slip with a Höppler viscosity of 155 mPas, followed by homogenization for 1 minute at 4,200 r.p.m. with the dispersion disk (diameter 4 cm) of a Pendraulik laboratory mixer. The homogenized slip was uniformly and quickly knife-coated (gap width 200 μm) onto a cleaned and degreased glass plate.

The coating slip consisted of:
100 parts by weight kaolin and calcium carbonate (70:30)
9.5 parts by weight latex (Dow 685)
3.5 parts by weight starch
0.35 part by weight glyoxal (for wet strength)
1.0 part by weight calcium stearate The dry slip coating was visually examined for bubble formation and defects, such as fish eyes, and marked on a points scale of 1 to 6 (6=very good, 1=very poor). A mixture of a fatty acid ester, fatty alcohol and polyglycol (Espum EPC 3061®, a product of Henkel KGaA) was used for comparison. Where the block copolyester A2 (according to the invention) was added, the slip coating received a score of 6 and, in the case of the comparison mixture, a score of 4.

We claim:

1. The process of controlling foam in a foam-generating system consisting of adding to said system a foam-inhibiting effective amount of a block copolymer obtained by reacting a homopolymer or copolymer of alkylene oxides consisting of ethylene oxide and propylene oxide with a diisocyanate or a dicarboxylic acid derivative containing 2 to 44 carbon atoms.

2. A process as in claim 1 wherein said block copolymer is obtained by reacting said homopolymer or copolymer of alkylene oxides with said diisocyanates or said dicarboxylic acid derivative in a molar ratio of 2:1 to 1:2 and, optionally, further reacting free functional terminal groups of said block copolymer with monofunctional compounds which are capable of reacting with the free functional terminal groups.

3. A process as in claim 1 wherein said block copolymer is obtained by reacting said diisocyanate with a homopolymer or a copolymer of ethylene oxide or propylene oxide in a molar ratio of hydroxyl groups to isocyanate groups of 1:2 to 2:1.

4. A process in claim 1 wherein said block copolymer is obtained by reacting said diisocyanate with a mixture of polypropylene glycol and polyethylene glycol containing 1% to 99% by weight of polypropylene glycol and 1% to 99% by weight of polyethylene glycol.

5. A process as in claim 1 wherein said block copolymer is obtained by reacting a diisocyanate selected from the group consisting of tolylene diisocyanate, tetramethyl xylylene diisocyanate, hexamethylene diisocyanate and trimethyl hexamethylene diisocyanate with a mixture of 75% to 95% by weight of polypropylene glycol and 25% to 5% by weight of polyethylene glycol.

6. A process as in claim 1 wherein said block copolymer is obtained by reacting said dicarboxylic acid derivative with a homopolymer or copolymer of ethylene oxide or propylene oxide in a molar ratio of hydroxyl groups to carboxyl groups of 1:2 to 2;1.

7. A process as in claim 1 wherein said block copolymer is obtained by reacting said dicarboxylic acid derivative with a mixture of polypropylene glycol and polyethylene glycol containing 1% to 99% by weight of polypropylene glycol and 1% to 99% by weight of polyethylene glycol.

8. A process as in claim 7 wherein said polyethylene glycol has a molecular weight of 200 to 35,000 and said polypropylene glycol has a molecular weight of 300 to 20,000.

9. A process as in claim 1 wherein said foam-generating system comprises a sugar production system.

10. A process as in claim 1 wherein said foam-generating system comprises a potato production system.

11. A process as in claim 1 wherein said foam-generating system comprises a food production system.

12. A process as in claim 1 wherein said foam-generating system comprises a paint or lacquer production system.

13. A process as in claim 1 wherein said foam-generating system comprises a paper production system.

14. A process as in claim 1 wherein said foam-generating system comprises a fermentation system.

15. A process as in claim 1 wherein said foam-inhibiting effective amount is from about 10 ppm to about 10,000 ppm.

* * * * *